United States Patent Office 3,687,820
Patented Aug. 29, 1972

3,687,820
PROCESS FOR SEPARATING MIXTURES OF N,N-DIMETHYLACETAMIDES AND ACETIC ACID BY DISTILLING WITH ALTERNATE PRESSURES
Robert B. Akell and Harold S. Kemp, Wilmington, Del., assignors to E. I. du Pont de Nemours and Company, Wilmington, Del.
Continuation-in-part of abandoned application Ser. No. 811,112, Mar. 27, 1969, which is a continuation-in-part of abandoned application Ser. No. 601,851, Dec. 15, 1966. This application Nov. 23, 1970, Ser. No. 92,225
Int. Cl. B01d; C07c 51/44, 97/16
U.S. Cl. 203—78                                6 Claims

ABSTRACT OF THE DISCLOSURE

A process is provided for separating N,N - diethyl-acetamide from a mixture thereof with acetic acid by subjecting such mixtures to plural distillations at different pressures whereby N,N-dimethylacetamide is recovered as distillate from a low pressure distillation zone operating at a pressure between about 50 mm. Hg and about 1 atmosphere and acetic acid is recovered as distillate from a higher pressure distillation zone operating at a pressure between about 1 atmosphere and 4 atmospheres.

The present application is a continuation-in-part of copending application Ser. No. 811,112, filed on Mar. 27, 1969, now abandoned and which is a continuation-in-part of copending application Ser. No. 601,851, filed on Dec. 15, 1966 and now abandoned.

BACKGROUND OF THE INVENTION

N,N-dimethylacetamide (DMAC) is a valuable chemical product. For example, it is used in substantial quantities in the spinning of certain synthetic filaments. This amide is frequently available in admixture with acetic acid, which is undesirable for many applications of DMAC if present in substantial amount or with other impurities. This mixture cannot be separated by simple distillation because, as is well known, N,N-dimethylacetamide and acetic acid form azeotropes. The azeotropes can be resolved by distillation using a third component, such as certain alkylbenzenes as is taught in the U.S. patent to Freure, No. 2,953,503. However, this requires use of large amounts of the third component normally. That can be undesirably expensive, especially where special recovery facilities must be provided to avoid undue loss of the added component. A new and improved process to separate mixtures of DMAC and acetic acid is accordingly needed.

In accordance with the present discovery mixture of DMAC and acetic acid are separated into the two components by consecutive distillation at two different pressures. The pressure employed in each of the distillation steps is dependent on the composition of the mixture of DMAC and acetic acid used as a starting material therein. However, each pressure employed is in the range of about 10 millimeters to 3,000 millimeters of mercury, although lower and higher pressues may also be used. The efficiency of separation is increased as the difference between the pressures employed in the different stages becomes greater. However, it is possible to operate at two pressures not far separated. It has been found convenient to carry out the separation by operating one disillation at atmospheric pressure, and the other at a reduced pressure in the range of about 50 to 300 millimeters of mercury. In this simple fashion, substantial recovery of DMAC and acetic acid, free from one another, is achieved.

In one embodiment of the process, it is preferable that neither of the two pressures used be greater than atmospheric pressure. In this way the process can be carried out at relatively low temperatures and this will minimize the formation of acetic anhydride in the system by dehydration of acetic acid. For some uses it is desirable that the DMAC contain only small amounts of acetic anhydride, such as when it is used as a medium for polymer-forming reactions. For example, diamines react with acetic anhydride, and the resulting loss of amino functional groups would upset the stoichiometric balance of the polymer-forming system. To avoid other undesirable contamination, the construction materials for the distillation equipment should be substantially inert to the system. Stainless steel alloys can be used, and are not attacked by the acetic acid.

The nature and advantages of the process of the present invention will be more clearly understood by the following description thereof and the accompanying drawings in which.

The DMAC/acetic acid azetrope is a high boiling (negative) azeotrope; that is, the boiling point of the azeotrope is higher than that of either component. For example, at atmospheric pressure acetic acid boils at 118° C., DMAC at 166° C., and the azeotrope at 171° C. The composition of the DMAC/acetic acid azeotrope varies with pressure and representative azeotrope compositions at various pressures are given in the following table.

TABLE 1

| Pressure, mm. | Boiling point, ° C. | Composition of azeotrope (weight percent) | |
| | | DMAC | Acetic acid |
|---|---|---|---|
| 100 | 109 | 73.3 | 26.7 |
| 760 | 171 | 79 | 21 |
| 2828 | 228 | 86.5 | 13.5 |

With respect to any given reference pressure, an available mixture of DMAC and acetic acid can be the azeotropic composition for the reference pressure, or other DMAC or acetic acid can be in excess of the azeotropic composition. The actual composition available will determine the order of pressures to be used in the distillation steps. For example, if the feed contains more DMAC than is in the high pressure azeotrope (Table 1, above), it must be fed to a low pressure distillation zone. If the feed contains less DMAC than the low pressure azeotrope (Table 1), it must be fed to the high pressure distillation zone. If the feed contains an amount of DMAC intermediate those two compositions, it may be fed to either a high or a low pressure zone as a first step in the process of this invention.

In the present invention either batch or continuous distillation practices can be followed. Both such practices are well known and the techniques available in those arts can be used in this process. For batch operations, a combined still pot and rectifying column can be used. After charging the still and establishing the desired pressure, the charge is distilled to recover as distillate the component that is in excess of the azeotropic composition at the operating pressure. This distillation should be stopped shortly before the still concentration reaches that of the azeotrope. Thereupon, the pressure on the system is changed to one at which the other component will be present in excess of the azeotropic composition at the second operating pressure; then the second distillation is carried out to distill off the other component until the composition approaches the azeotropic composition.

Figure 1:
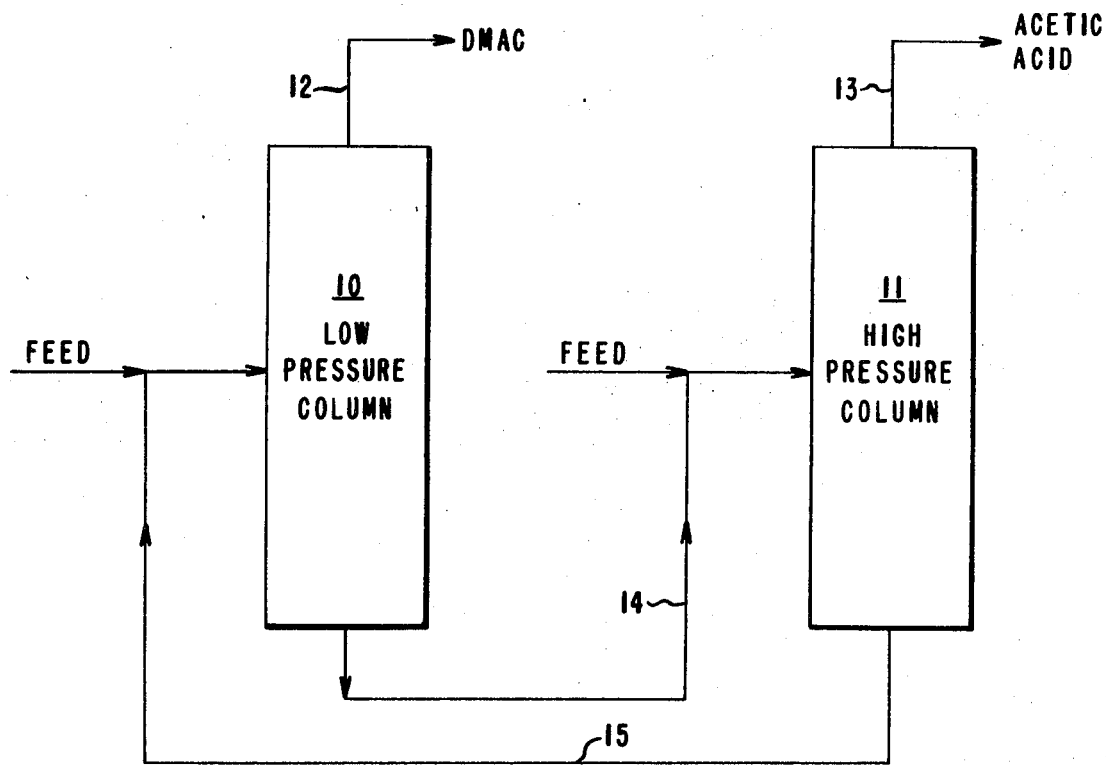
FIG. 1 illustrates an integrated process utilizing two distillation columns.
Figure 2:
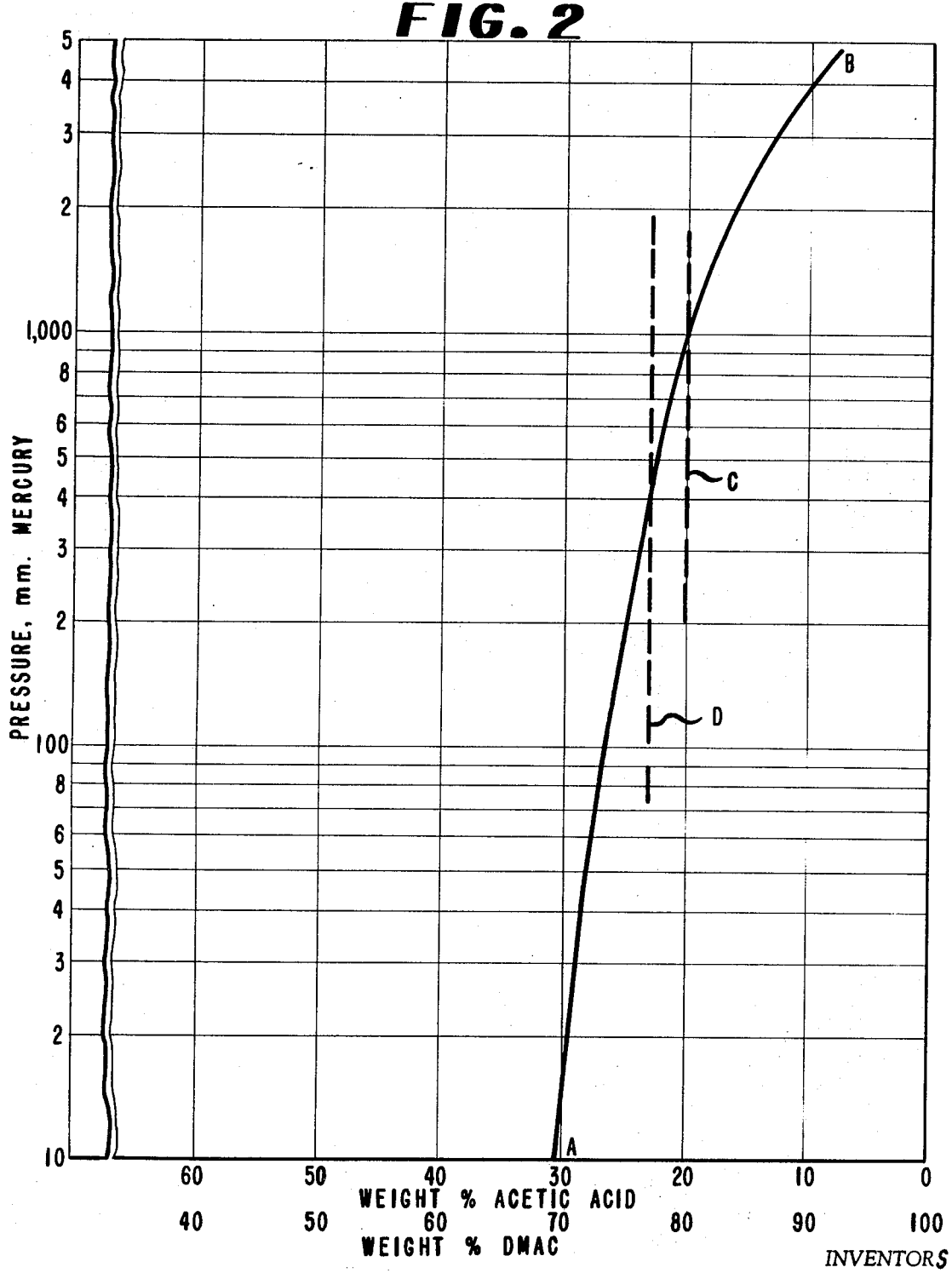
FIG. 2 illustrates graphically a plot of pressure versus weight percent of the acetic acid and N,N-dimethylacet-amide azeotrope.

In continuous operations it is convenient to employ two distillation columns, one a low pressure unit and the other a high pressure operation. Feed to either may be introduced near the middle of the columns. The bottoms product from the low pressure column is fed to the feed zone of the high pressure column and the bottoms product of the latter column is fed to the feed zone of the low pressure column. Additional feed stock is fed to either zone as determined by its composition, as stated above. The distillate of the low pressure column is DMAC and that of the high pressure column is acetic acid. Common practices such as the removal of tars and the like can be accomplished in the usual manner by cycling bottoms to a tar still where the volatiles are condensed and returned to the separation system, and the tar discarded. The foregoing operation of the continuous process is illustrated in FIG. 1 which shows introducing as FEED the mixture of DMAC and acetic acid continuously either to low pressure distillation column 10 or high pressure distillation column 11. The composition of the FEED and the level of operating pressures in columns 10 and 11 will ordinarily determine which one of the two columns into which the FEED will be introduced. For example, if the composition of the FEED is characterized by greater than about 80% by weight of DMAC, then the FEED will ordinarily be introduced into column 10. The foregoing is true in most instances as when the operating pressure in column 10 is between about 10 mm. Hg. and 350 mm. Hg, and the pressure in column 11 is between about 1 and 2 atmospheres. If, however, column 11 is operated at 3000 mm. Hg, then such FEED would be introduced into column 11 rather than column 10. The selection of which one of columns 10 or 11 for introducing the FEED may readily be determined by reference to FIG. 2 which depicts graphically the relationship between pressure and the composition of the acetic acid/N,N-dimethylacetamide azeotrope. Solid line A–B in FIG. 2 shows the azeotrope composition over the range of interest herein, between about 30/40 and about 10/90 weight percent of acetic acid/DMAC, plotted in relationship to pressure extending from 10 mm. Hg to about 5000 mm. Hg. Dotted line C in FIG. 2 is drawn vertically along the line representing a mixture of 80% by weight of DMAC and 20% by weight of acetic acid, and thus is representative of the example discussed above. In this instance, the isobar at 350 mm. Hg intersects line A–B at a point corresponding to a mixture of 23.5% by weight of acetic acid and 76.5% by weight of DMAC and the difference between lines A–B and C, in terms of acetic acid, is 3.5% by weight (units), whereas, the difference between lines A–B and C at an isobar of say, 1 atmosphere, is virtually negligible. The FEED would therefore be introduced into the low pressure column which would be column 10. On the other hand, if column 11 is operated at 3000 mm. Hg., then the difference between lines A–B and C at isobar 3000 is about 7 units. In this instance, the FEED would therefore be introduced into column 11, since the composition difference between the FEED and the azeotrope is greater at 3000 mm. Hg than at 350 mm. Hg.

If the composition of the FEED is characterized by less than 75% by weight of DMAC, then the FEED will ordinarily be introduced into column 11. The same pressure considerations discussed above also obtain in this instance as regards the selection of column 10 or column 11 for introducing FEED material thereinto. The procedure described above would be followed for selecting the proper column for introducing FEED material into the process.

If the FEED is between about 75% and 80% by weight of DMAC, then the FEED may be introduced into one or the other of columns 10 or 11, depending again upon the operating pressures selected for the columns. For instance, if the FEED composition is 23% by weight acetic acid and 77% by weight of DMAC, as indicated by dotted line D in FIG. 2, and columns 10 and 11 are operated at 350 mm. Hg and 1 atmosphere, respectively, then the FEED would be introduced into column 11 because the unit difference between line A–B and line D is greater at isobar 760 mm. Hg (about 2 units) than at 350 mm. Hg (about 0.5 unit). On the other hand, if column 10 is operated at a pressure of 50 mm. Hg, instead of 350 mm. Hg, then the unit difference between lines A–B and D at isobar 50 is about 5 units which is greater than the unit difference between these lines at isobar 1 atmosphere. The FEED would therefore be introduced into column 10 in this specific instance.

In a typical operation, the low pressure column 10 is maintained at a pressure between about 10 mm. Hg and 350 mm. Hg, and the high pressure column 11 is maintained at a pressure between about 1 atmosphere and about 4 atmospheres, and the FEED rate into the selected one of columns 10 or 11 is coordinated with the heating capacity of that column. Under the foregoing operating conditions, substantially pure DMAC is removed as distillate overhead of column 10 by way of conduit 12 and at a temperature between about 87° C. and about 140° C., and substantially pure acetic acid is removed as distillate overhead of column 11 by way of conduit 13 and at a temperature between about 118° C. and 170° C. As shown in FIG. 1, a portion of the DMAC and acetic acid mixture in the bottom of column 10 is removed by way of conduit 14 and introduced into the FEED zone of column 11. Also, a portion of the DMAC and acetic acid mixture in the bottom of column 11 is removed by way of conduit 15 and introduced into the FEED zone of column 10.

The process will be further described in conjunction with the following examples:

Example I

A mixture of DMAC and acetic acid, present in an 80:20 weight ratio, was charged to a still pot. Vacuum on the system was drawn until a pressure of 60 millimeters of mercury was reached. Distillation was initiated, by heat supplied to the mixture in the still pot, and the distillate was recovered. Essentially pure DMAC was recovered as the distillate until the composition of the residue in the still pot was about 70:30 DMAC/acetic acid, at which point pure DMAC could no longer be recovered, since that composition represents the composition of the azeotrope at that pressure.

The residual liquid in the still pot was then distilled at atmospheric pressure through a small, low-efficiency column. The distillate obtained analyzed for 65.4% acetic acid, by weight, which represents a composition far richer in acetic acid than the azeotrope. The residual liquid in the still pot then was found to be 77:23 DMAC/acetic acid.

Example II

In a partial practice of the invention, an 80:20 ratio of DMAC and acetic acid, by weight, was distilled in batch distillation equipment at a pressure of 193 millimeters. In this case, essentially pure DMAC was recovered at a vapor temperature of 127–128° C. until the composition of the material in the pot approached a weight ratio of 75:25, at which point pure DMAC could no longer be recovered, this being the approximate composition of the azeotrope at this pressure

Example III

In an analogous practice, a mixture of 70:30 DMAC acetic acid by weight was fed continuously, at a rate of 18 cc. per minute, to the tenth plate from the bottom of a 30-plate column operating at atmospheric pressure. Sufficient heat was supplied to a reboiler at the bottom to maintain to a reflux ratio of 20 parts of reflux to one part of take-off. A top column temperature of 117–119° C. was maintained by drawing off product at the rate of 1.41 cc.

per minute; this temperature is the boiling point of pure acetic acid at atmospheric pressure. Analysis of the overhead product indicated it to be essentially 100% acetic acid. Analysis of the bottoms of the column showed it to be 78:22 DMAC/acetic acid by weight, which is approximately the composition of the DMAC/acetic acid azeotrope at atmospheric pressure. The bottom temperature was 173–174° C., which is approximately the boiling point of the azeotrope at atmospheric pressure.

The bottoms product of this example could be employed as the feed for the distillation in Example II to complete the entire process.

Example IV

A mixture of 527 parts of DMAC and 102 parts of acetic acid was distilled in a fractionating column at 350 mm. mercury pressure. (At 350 mm., the azeotrope is 76.3:23.7 DMAC/acetic acid.) There was collected 229 parts of DMAC (purity 97%). Further distillation at this pressure gave mixtures of DMAC and acetic acid approach the azeotrope in composition.

The residual liquid in the still pot was distilled at atmospheric pressure. There was collected 3 parts of acetic acid (purity 88%), which represents a composition much richer in acetic acid than the azeotrope.

Example V

In this example, still pot capacity was 11,000 gallons. The column used contained 40 sieve plates on one foot spacing. Column diameter was 4 feet. Maximum boilup was about 25–30 gallons per minute. In addition to acetic acid and N,N-dimethylacetamide, small amounts of water and other volatile materials, and small amounts of non-volatile residues were present in the charge.

In view of the composition to be resolved, the first stage distillation was a vacuum cycle. At the beginning of the vacuum cycle, the pot composition, by weight, was as follows: acetic acid, 18.8%; dimethylacetamide, 76.3%; water, 0.2% other, 4.7%.

Table 2 lists operating conditions and product compositions from the first vacuum cycle. In the following tables, data given under "0 hrs., elapsed time," is the data and analysis of that material at the top of the distillation column under conditions of total reflux.

TABLE 2

| | | |
|---|---|---|
| Elapsed time (hrs.) | 0 | 1 |
| Column head pressure (mm. Hg) | 300 | 300 |
| Pot temperature (° C.) | 146 | 146 |
| Overhead temp. (° C.) | 130 | 130 |
| Reflux ratio | 13:1 | 13:1 |
| Overhead composition, percent: | | |
| Acetic acid | 0.06 | 0.05 |
| Dimethylacetamide | 86.7 | 93.3 |
| Water | 8.15 | 0.71 |

This cycle was continued for 18½ hours and the overhead composition, as determined by water and acetic acid analysis, did not vary significantly from that given under "1 hour elapsed time."

Approximately 12,800 lbs. of overhead were collected during the first vacuum cycle. At the end of the cycle the pot composition, by weight, was: acetic acid 26.4%; dimethylacetamide, 69.2%; other, 4.4%; and contained 103 p.p.m. of water.

The column was then set to total reflux, vacuum was broken, and the pressure was increased by adding dry nitrogen. When the column had steadied out at the new conditions, product was withdrawn, as shown in Table 3 for the first pressure cycle.

TABLE 3.—FIRST PRESSURE CYCLE

| | | |
|---|---|---|
| Elapsed time (hr.) | 0 | 1 |
| Column pressure (p.s.i.g.) | 4 | 2 |
| Pot temperature (° C.) | 183 | 180 |
| Overhead temperature (° C.) | 169 | 176 |
| Reflux ratio | ca. 6:1 | ca. 6:1 |
| Overhead composition: Acetic acid (percent) | 89.6 | 57.7 |

At the end of the first pressure cycle, the pot composition, by weight was: acetic acid, 22.1%; dimethylacetamide, 74.4%; other, 3.5%; and contained 62 p.p.m. of water. Following the first pressure cycle, the column and contents were cooled and vacuum again drawn on the system. After steadying out at total reflux, the second vacuum cycle was begun. Table 4 presents data for this cycle.

TABLE 4.—SECOND VACUUM CYCLE

| | | | |
|---|---|---|---|
| Elapsed time (hr.) | 0 | 1¼ | 3 |
| Column pressure (mm. Hg) | 50 | 50 | 50 |
| Pot temperature (° C.) | 124 | 124 | 129 |
| Overhead temperature (° C.) | 96 | 96 | 96 |
| Reflux ratio | 4:1 | 4:1 | 4:1 |
| Overhead composition: | | | |
| Acetic acid (percent) | 0.43 | 0.33 | 0.77 |
| Dimethylacetamide (percent) | Bal. | Bal. | Bal. |
| Water (p.p.m.) | 581 | 439 | 356 |

Vacuum on the system was then released. The pot composition at the end of the second vacuum cycle was: acetic acid, 25.3%; dimethylacetamide, 69.9%; other, 4.8%; and 90 p.p.m. water.

About 400 to 500 gallons of material slightly higher in dimethylacetamide than what was already in the pot was added to it. Pot composition after this addition was: acetic acid, 24.3%; dimethylacetamide, 73.4%; other, 2.3%; and 140 p.p.m. water.

Pressure was again built up by the addition of dry nitrogen to the unit. The system was allowed to steady out at total reflux. A second pressure cycle was then run. Some data from this cycle are given in Table 5.

TABLE 5

Second pressure cycle

| | |
|---|---|
| Elapsed time (hr.) | ½ |
| Column pressure (p.s.i.g.) | 10 |
| Pot temperature (° C.) | 191 |
| Overhead temperature (° C.) | 136 |
| Reflux ratio | ca. 10:1 |
| Overhead composition: | |
| Acetic acid, percent | 97.88 |
| Dimethylacetamide, percent | 0.60 |
| Water, percent | 1.36 |

Approximately 1680 lbs. of overhead were collected during the second pressure cycle. Pot composition at the end of the second pressure cycle was: acetic acid, 23.0%; dimethylacetamide, 72.4%; other, 4.6%; and 62 p.p.m. of water.

From the foregoing discussion and description, it is evident that the present process is an effective method of separating DMAC and acetic acid from mixtures of them. If greater purity of either product is desired, redistillation or more efficient equipment can be employed.

We claim:

1. Process for separating N,N-dimethylacetamide from a mixture thereof with acetic acid which comprises:
   introducing a mixture of N,N-dimethylacetamide and acetic acid into an initial distillation zone maintained at a pressure of between about 10 mm. Hg and about 350 mm. Hg,
   removing overhead from said initial distillation zone a mixture enriched in N,N-dimethylacetamide and containing at least 90% by weight, based upon the total weight of the mixture removed overhead, of N,N-dimethylacetamide,
   withdrawing a substantially azeotropic mixture of N,N-dimethylacetamide and acetic acid from said initial distillation zone and introducing said mixture into a secoind distillation zone maintained at a pressure between about 1 atmosphere and about 4 atmospheres,
   removing overhead from said second distillation zone a mixture enriched in acetic acid and containing at least 50% by weight, based upon the total weight of the mixture removed overhead, of acetic acid,
   and withdrawing a substantially azeotropic mixture of N,N-dimethylacetamide and acetic acid from said second distillation zone and recycling said mixture to said initial distillation zone.

2. Process for separating N,N-dimethylacetamide from a mixture thereof with acetic acid which comprises:
introducing a mixture comprising between about 15% and about 23% by weight, based upon the total weight of the mixture, of acetic acid and between about 77% and about 85% by weight, based upon the total mixture weight, of N,N-dimethylacetamide, into an initial distillation zone maintained at a pressure of between 10 mm. Hg and about 350 mm. Hg,
removing overhead from said initial distillation zone N,N-dimethylacetamide,
withdrawing a substantially azeotropic mixture comprising between about 22% and about 30% by weight, based upon the total mixture weight, of acetic acid and between about 70% and about 78% by weight, based upon the total mixture weight, of N,N-dimethylacetamide, and introducing said mixture into a second distillation zone maintained at a pressure between about 1 atmosphere and about 4 atmospheres,
removing overhead from said second distillation zone acetic acid,
and withdrawing a substantially azeotropic mixture comprising between about 13% and about 21% by weight, based upon the total mixture weight, of acetic acid and between about 79% and about 87% by weight, based upon the total mixture weight, of N,N-dimethylacetamide, and recycling said mixture to said initial distillation zone.

3. Process for separating N,N-dimethylacetamide from a mixture thereof with acetic acid which comprises:
introducing a mixture comprising between about 21% and about 30% by weight, based upon the total weight of the mixture, of acetic acid and between about 70% and about 79% by weight, based upon the total mixture weight, of N,N-dimethylacetamide, into an initial distillation zone maintained at a pressure of between 1 atmosphere and about 4 atmospheres.
removing overhead from said initial distillation zone acetic acid,
withdrawing a substantially azeotropic mixture comprising between about 13% and about 21% by weight, based upon the total mixture weight, of acetic acid and between about 79% and 87% by weight, based upon the total mixture weight, of N,N-dimethylacetamide, and introducing said mixture into a second distillation zone maintained at a pressure between about 10 mm. Hg and about 350 mm. Hg,
removing overhead from said second distillation zone N,N-dimethylacetamide,
and withdrawing a substantially azeotropic mixture comprising between about 22% and about 30% by weight, based upon the total mixture weight, of acetic acid and between about 70% and about 78% by weight, based upon the total mixture weight, of N,N-dimethylacetamide, and recycling said mixture to said initial distillation zone.

4. Process for separating N,N-dimethylacetamide from a mixture thereof with acetic acid which comprises:
introducing a mixture of N,N-dimethylacetamide and acetic acid into an initial distillation zone maintained at a pressure of between about 1 atmosphere and 4 atmospheres,
removing overhead from said initial distillation zone a mixture enriched in acetic acid and containing at least 50% by weight, based upon the total weight of the mixture removed overhead, of acetic acid,
withdrawing a substantially azeotropic mixture of N,N-dimethylacetamide and acetic acid from said initial distillation zone and introducing said mixture into a second distillation zone maintained at a pressure between about 10 mm. Hg and about 350 mm. Hg,
removing overhead from said second distillation zone a mixture enriched in N,N-dimethylacetamide and containing at least 90% by weight, based on the total weight of the mixture removed overhead, of N,N-dimethylacetamide,
and withdrawing a substantially azeotropic mixture of N,N-dimethylacetamide and acetic acid from said second distillation zone and recycling said mixture to said initial distillation zone.

5. Process for separating N,N-dimethylacetamide from a mixture thereof with acetic acid which comprises:
distilling a mixture of N,N-dimethylacetamide and acetic acid at an initial pressure of between about 10 mm. Hg and about 350 mm. Hg,
removing overhead from the initial distillation, a mixture enriched in N,N-dimethylacetamide and containing at least 90% by weight, based on the total weight of the mixture removed overhead, of N,N-dimethylacetamide,
distilling the resulting azeotropic mixture of N,N-dimethylacetamide and acetic acid at a second distillation pressure of about from 1 atmosphere to 4 atmospheres,
and removing overhead from the second distillation pressure a mixture enriched in acetic acid and containing at least 50% by weight, based on the total weight of the mixture removed overhead, of acetic acid.

6. Process for separating N,N-dimethylacetamide from a mixture thereof with acetic acid which comprises:
distilling a mixture of N,N-dimethylacetamide and acetic acid at an initial pressure of about from 1 atmosphere to about 4 atmospheres,
removing overhead from the initial distillation pressure a mixture enriched in acetic acid and containing at least 50% by weight, based on the total weight of the mixture removed overhead, of acetic acid,
distilling the resulting azeotropic mixture of N,N-dimethylacetamide and acetic acid at a second distillation pressure of between about 10 mm. Hg and about 350 mm. Hg,
and removing overhead from the second distillation, a mixture enriched in N,N-dimethylacetamide and containing at least 90% by weight, based on the total weight of the mixture removed overhead, of N,N-dimethylacetamide.

References Cited

UNITED STATES PATENTS

| | | | |
|---|---|---|---|
| 2,901,407 | 8/1959 | Colton | 203—78 |
| 2,953,503 | 9/1960 | Freure | 203—67 |
| 2,998,357 | 8/1961 | Gillette et al. | 203—77 |
| 3,072,725 | 1/1963 | Surman | 260—561 |
| 3,147,199 | 9/1964 | Neel | 203—77 |
| 3,147,200 | 9/1964 | Neel | 203—75 |
| 3,261,877 | 7/1966 | Dierschke et al. | 203—80 |
| 3,300,531 | 1/1967 | James et al. | 260—561 |
| 3,329,586 | 7/1967 | Pettingill | 203—78 |

OTHER REFERENCES

Azeotropic Data: Hursley, June 1952, American Chemical Society, Washington, D.C., pp. 315 and 318–322.

WILBUR L. BASCOMB, JR., Primary Examiner

U.S. Cl. X.R.

203—80, 94, DIG 11; 260—541, 561